(12) United States Patent
Johnson et al.

(10) Patent No.: US 11,905,158 B2
(45) Date of Patent: Feb. 20, 2024

(54) FILTRATION COOLER SYSTEM

(71) Applicant: 4Patriots, LLC, Nashville, TN (US)

(72) Inventors: Matt Johnson, Pleasant Grove, UT (US); Ryan Brooks, Herriman, UT (US); Bradley A. Yaggie, Two Rivers, WI (US)

(73) Assignee: 4Patriots, LLC, Nashville, TN (US)

( * ) Notice: Subject to any disclaimer, the term of this patent is extended or adjusted under 35 U.S.C. 154(b) by 52 days.

(21) Appl. No.: 17/542,748

(22) Filed: Dec. 6, 2021

(65) Prior Publication Data
US 2023/0174365 A1 Jun. 8, 2023

(51) Int. Cl.
| | | |
|---|---|---|
| *B65D 81/38* | (2006.01) | |
| *B65D 51/28* | (2006.01) | |
| *B65D 53/02* | (2006.01) | |
| *C02F 1/00* | (2023.01) | |
| *B65D 25/28* | (2006.01) | |
| *B67D 3/00* | (2006.01) | |
| *B01D 29/11* | (2006.01) | |

(52) U.S. Cl.
CPC ............ *B67D 3/0061* (2013.01); *B01D 29/11* (2013.01); *B65D 25/282* (2013.01); *B65D 51/28* (2013.01); *B65D 53/02* (2013.01); *B65D 81/3816* (2013.01); *B67D 3/0009* (2013.01); *C02F 1/001* (2013.01); *B65D 2205/02* (2013.01); *B67D 2210/0001* (2013.01); *C02F 2307/10* (2013.01)

(58) Field of Classification Search
CPC ................ B67D 3/0061; B67D 3/0009; B67D 2210/0001; B01D 29/11; B65D 25/282; B65D 51/28; B65D 53/02; B65D 81/3816; B65D 2205/02; C02F 1/001; C02F 2307/10
See application file for complete search history.

(56) References Cited

U.S. PATENT DOCUMENTS

| | | | | |
|---|---|---|---|---|
| 126,926 | A * | 5/1872 | Brady | ................ B01D 17/0211 210/182 |
| 289,263 | A * | 11/1883 | Howe | ................... F25D 31/002 62/319 |
| 8,327,659 | B2 * | 12/2012 | Winkler | .................... F25D 3/08 220/592.25 |
| 9,193,605 | B2 * | 11/2015 | Minton-Edison | ....... C02F 1/002 |

(Continued)

FOREIGN PATENT DOCUMENTS

EP 384150 A * 8/1990 ............ B01D 35/30

*Primary Examiner* — Terry K Cecil
(74) *Attorney, Agent, or Firm* — Polsinelli PC

(57) ABSTRACT

A filtration cooler system includes a cooler reservoir having a reservoir receiving portion, a lid coupled with the cooler reservoir, a drip tray, a filter bucket, and a filter. The drip tray is received by the cooler reservoir such that the drip tray is disposed over the reservoir receiving portion. The filter bucket has a filter receiving portion operable to receive water. The filter bucket is received by the drip tray when the drip tray is disposed over the reservoir receiving portion. The filter is received in the filter bucket. The filter filters the water in the filter bucket such that the water passes from the filter bucket into the reservoir receiving portion. The drip tray and the filter bucket can be nested such that the drip tray and the filter bucket fit within the reservoir receiving portion when the lid is closed over the cooler reservoir.

15 Claims, 7 Drawing Sheets

FIG. 7

(56) References Cited

U.S. PATENT DOCUMENTS 10,272,934 B2 * 4/2019 DeFrancia ................ B62B 1/12
2016/0114271 A1 * 4/2016 Michaud ................ C02F 1/003
                                                              210/807

* cited by examiner

FILTRATION COOLER SYSTEM

FIELD

The present disclosure is directed to the field of water filtration and storage systems. In at least one example, the present disclosure relates to an all-in-one water filtration and cooler to filter and store water at a desired temperature.

BACKGROUND

Water treatment devices and systems are useful during outdoor adventures. Clean water is necessary to prevent dehydration, disease, and/or illness. When traveling or camping outdoors, an adventurer may want to minimize bulk and/or weight.

BRIEF DESCRIPTION OF THE DRAWINGS

Implementations of the present technology will now be described, by way of example only, with reference to the attached figures, wherein.

DETAILED DESCRIPTION

Figure 1A:
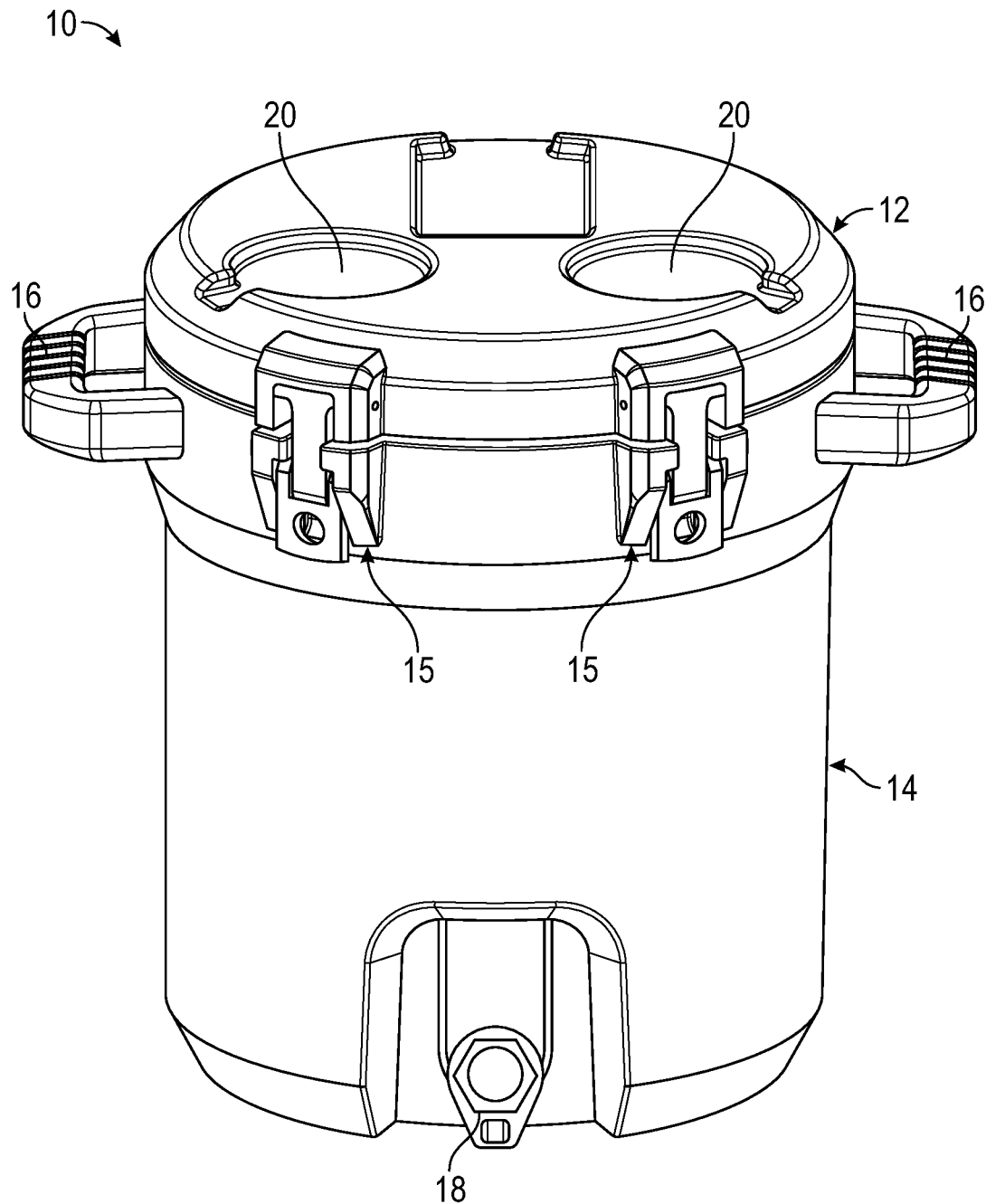
FIG. 1A is a schematic view of an exemplary filtration cooler system.

It will be appreciated that for simplicity and clarity of illustration, where appropriate, reference numerals have been repeated among the different figures to indicate corresponding or analogous elements. In addition, while specific details are set forth in order to provide an understanding of the examples described herein, it will be appreciated by those skilled in the art that the examples described herein can be practiced without these specific details. In other instances, methods, procedures and components have not been described in detail so as not to obscure the related relevant feature being described. Also, the description is not to be considered as limiting the scope of the examples described herein. The drawings are not necessarily to scale and the proportions of certain parts may be exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The term "communicatively coupled" is defined as connected, either directly or indirectly through intervening components, and the connections are not necessarily limited to physical connections, but are connections that accommodate the transfer of data between the so-described components. The connection can be such that the objects are permanently connected or releasably connected. The terms "comprising," "including" and "having" are used interchangeably in this disclosure. The terms "comprising," "including" and "having" mean to include, but not necessarily be limited to the things so described.

Where components are described as being "configured to" or "operable to" perform certain operations, such configuration or operation can be accomplished, for example, by designing electronic circuits or other hardware to perform the operation, by programming programmable electronic circuits (e.g., microprocessors, or other suitable electronic circuits) to perform the operation, or any combination thereof.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The present disclosure provides for a filtration cooler system that can filter water retrieved from a water source via a transfer bucket. The water to be filtered is deposited from the transfer bucket onto a filter bucket that is received on a drip tray over a cooler reservoir. The water in the filter bucket passes through a filter and the drinkable water is deposited and stored in a reservoir receiving portion in the cooler reservoir. As the cooler reservoir and the lid have insulation, the water can be maintained at a desired temperature, for example hotter or colder than the outside temperature. When the filtration cooler system is not in use, the drip tray, the filter bucket, and the transfer bucket can be nested within each other and stored in the reservoir receiving portion. Accordingly, the filtration cooler system can be stored without any excess bulk or loose components for easy storage and/or transport. Safe water can then be enjoyed anywhere with minimal bulk.

Figure 1B:
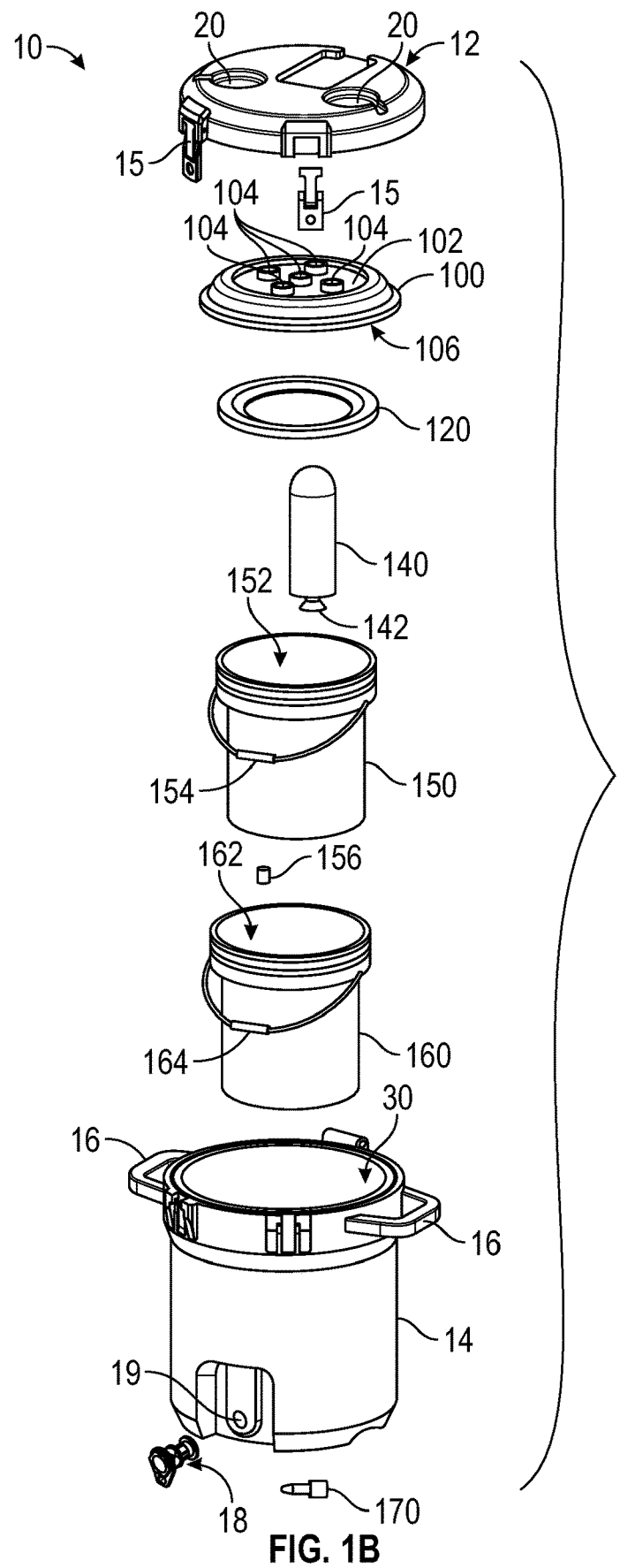
FIG. 1B is an exploded view of the filtration cooler system.

FIGS. 1A and 1B illustrate an exemplary filtration cooler system 10. The filtration cooler system 10 includes a lid 12 and a cooler reservoir 14. The lid 12 can be coupled with the cooler reservoir 14. In some examples, the lid 12 can be hingedly coupled with the cooler reservoir 14. In some examples, the lid 12 may be removably coupled with the cooler reservoir 14. When the lid 12 is closed over the cooler reservoir 14, one or more fasteners 15 may be utilized to ensure a sufficient seal between the lid 12 and the cooler reservoir 14. In some examples, the fasteners 15 can include cam latches. In some examples, the fasteners 15 can include zippers, hook and loop fasteners, and/or any other suitable fastening mechanism to maintain the closed relationship between the lid 12 and the cooler reservoir 14.

In some examples, as illustrated in FIGS. 1A and 1B, the lid 12 can include one or more utility recesses 20 on the top surface of the lid 12. The utility recesses 20 can be shaped to hold items that may be desired to be set down. For example, one or more of the utility recesses 20 can be shaped to receive cups as cup holders. In some examples, one or more of the utility recesses 20 can be shaped to receive a portable device such as a phone.

Figure 2:
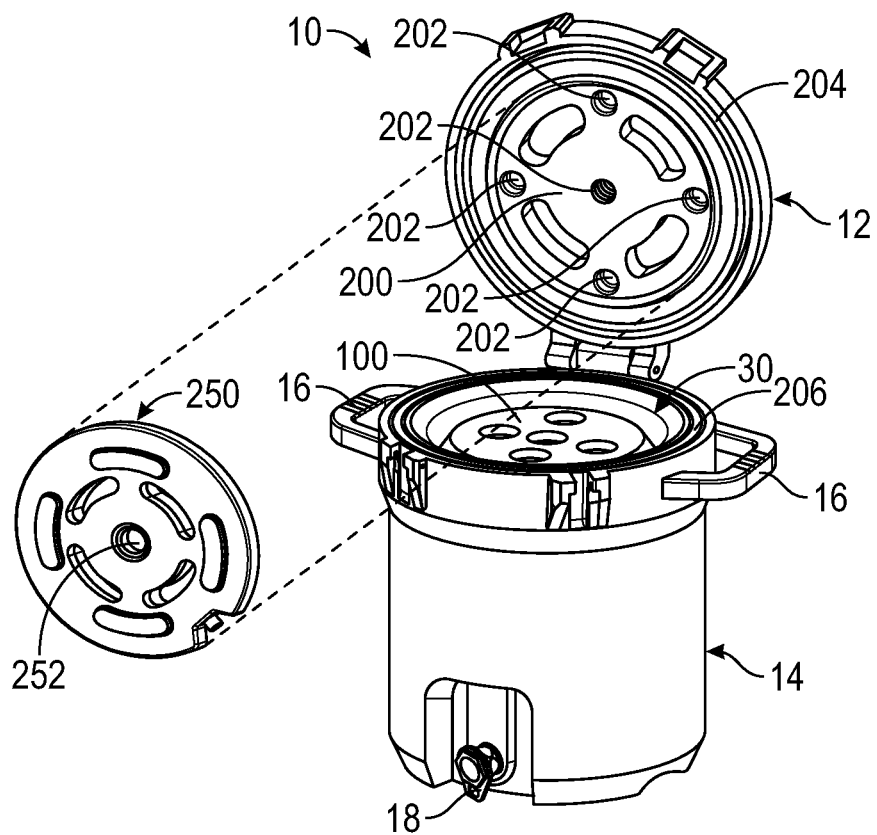
FIG. 2 illustrates the filtration cooler system with the lid in an open configuration.

In at least one example, referring to FIG. 2, the lid 12 can be operable to receive an ice pack 250. In at least one example, the lid 12 can be operable to receive the ice pack 250 on the underside 200 of the lid 12. Accordingly, the ice pack 250 can be in communication with the reservoir receiving portion 30 when the lid 12 is closed over the reservoir receiving portion 30. The ice pack 250 can then assist in maintaining a cooler temperature for the fluid within the reservoir receiving portion 30 when the lid 12 is closed. This is useful for adventurers that wish to have cold water to drink. With the insulation for the lid 12 and/or the cooler reservoir 14 and the ice pack 250, the water inside the reservoir receiving portion 30 can be maintained at a cool temperature (e.g., 15-50 degrees below the external air temperature) for a predetermined period of time (e.g., 1 or 2 days).

The ice pack 250 is operable to be cooled, for example in a freezer, to a cold temperature such as 32-40 degrees Fahrenheit. The ice pack 250 can be removably coupled with the lid 12 so that the ice pack 250 can be cooled in a refrigerator or freezer and placed onto the lid 12 when ready to be used. The lid 12 can include one or more ice fasteners 202 operable to couple the ice pack 250 with the underside 200 of the lid 12. In at least one example, the ice fasteners 202 can include a threaded bolt that can be inserted through a corresponding aperture 252 in the ice pack 250 and threaded into the underside 200 of the lid 12. In some example, the ice fasteners 202 can include protrusions that are operable to be inserted through the corresponding aperture 252 in the ice pack 250 and holds the ice pack 250 via force fit and/or an abutment surface.

The ice pack 250 is sized and/or shaped to fit onto the underside 200 of the lid 12 and fits within and/or over the reservoir receiving portion 30 when the lid 12 is closed. Even with the multiple components that may be nested and stored within the reservoir receiving portion 30 during storage, the ice pack 250 fits in the filtration cooler system 10 to avoid a loose component. Accordingly, storage and transportation during traveling is uncomplicated with avoidance of additional bulk or separate components.

The cooler reservoir 14 is operable to receive and store items and/or fluid such as water. The cooler reservoir 14 forms a reservoir receiving portion 30 which is operable to receive and/or store the items and/or fluid. In at least one example, the reservoir receiving portion 30 can be sized to receive between one to eight gallons of fluid. In some examples, the reservoir receiving portion 30 can be sized to receive between four to six gallons of fluid. In some examples, the reservoir receiving portion 30 can be sized to receive about five gallons of fluid. The cooler reservoir 14 includes insulation to reduce heat flow across the cooler reservoir 14. In some examples, the insulation can include foam. Accordingly, the cooler reservoir 14 can assist in maintaining the temperature of the contents within the reservoir receiving portion 30. For example, when cold water is stored in the reservoir receiving portion 30, the reservoir receiving portion 30 can maintain coldness of the water for a predetermined period of time, such as two days. In at least one example, the cooler reservoir can be made of medium density polyethylene. In some examples, the lid 12 can be made of medium density polyethylene. In some examples, the lid 12 can have insulation to assist in maintaining the temperature of the contents within the reservoir receiving portion 30 when the lid 12 is closed over the cooler reservoir 14. In some examples, the insulation can include foam. The materials of the lid 12 and the cooler reservoir 14 can be sturdy to withstand bumps, scratches, or impacts during travel or exploration.

In at least one example, the lid 12 can include a gasket 204 that extends from the underside 200 of the lid 12. The gasket 204 is operable to be received in a gasket recess 206 formed along the top rim of the cooler reservoir 14. In some examples, the gasket 204 can be made of neoprene rubber. Accordingly, the gasket 204 can be received in the gasket recess 206 when the lid 12 is closed and form a seal to prevent air and/or fluid passage across the closed lid 12. The prevention of air assists in maintaining the temperature differential between external the filtration cooler system 10 and within the reservoir receiving portion 30. For example, the water stored in the reservoir receiving portion 30 can be maintained at a cooler temperature for a longer period of time.

In at least one example, the cooler reservoir 14 can include at least one handle 16 extending therefrom. As illustrated in FIGS. 1A and 1B, the cooler reservoir 14 can include two handles 16. The handles 16 can be operable to allow for a user to grip and/or hold onto the handles 16 to lift the cooler reservoir 14. In at least one example, the handles 16 can be used a tie-down handles to secure the filtration cooler system 10 during travel, such as on a boat or a car.

Figure 3:
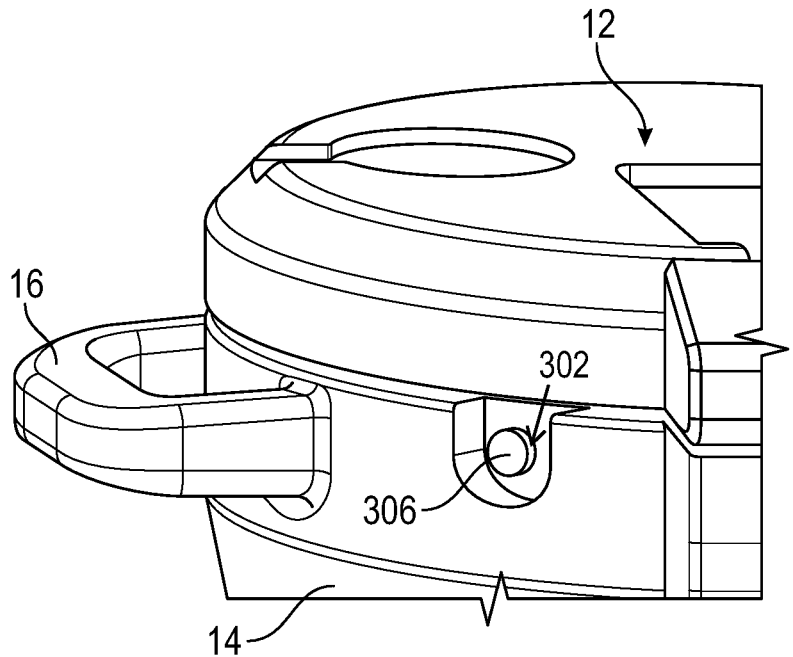
FIG. 3 is an enlarged portion of the cooler reservoir.

In at least one example, the cooler reservoir 14 can include a serving spout 18 in fluid communication with the reservoir receiving portion 30. Accordingly, the serving spout 18 is operable to permit fluid to be poured and/or removed from the reservoir receiving portion 30 without needing to open the lid 12. The serving spout 18 can be actuated, for example by pressing a button, to open a valve which permits fluid passage across the serving spout 18. The serving spout 18 can be disposed proximate the bottom of the cooler reservoir 14 such that all of the fluid within the reservoir receiving portion 30 can flow through the serving spout 18. In at least one example, as shown in FIG. 3, the cooler reservoir 14 can include a vent port 302 proximate to the lid 12 near the top of the cooler reservoir 14. A vent plug 306 is operable to be inserted into the vent port 302 to close the vent port 302. The vent port 302 can be opened (e.g., having the vent plug 306 removed) to create pressure within the reservoir receiving portion 30. Accordingly, the fluid within the reservoir receiving portion 30 can pass through the serving spout 18. With the vent port 302 opened, a vacuum is not created within the reservoir receiving portion 30 which would prevent the fluid from exiting through the serving spout 18.

Figure 4:
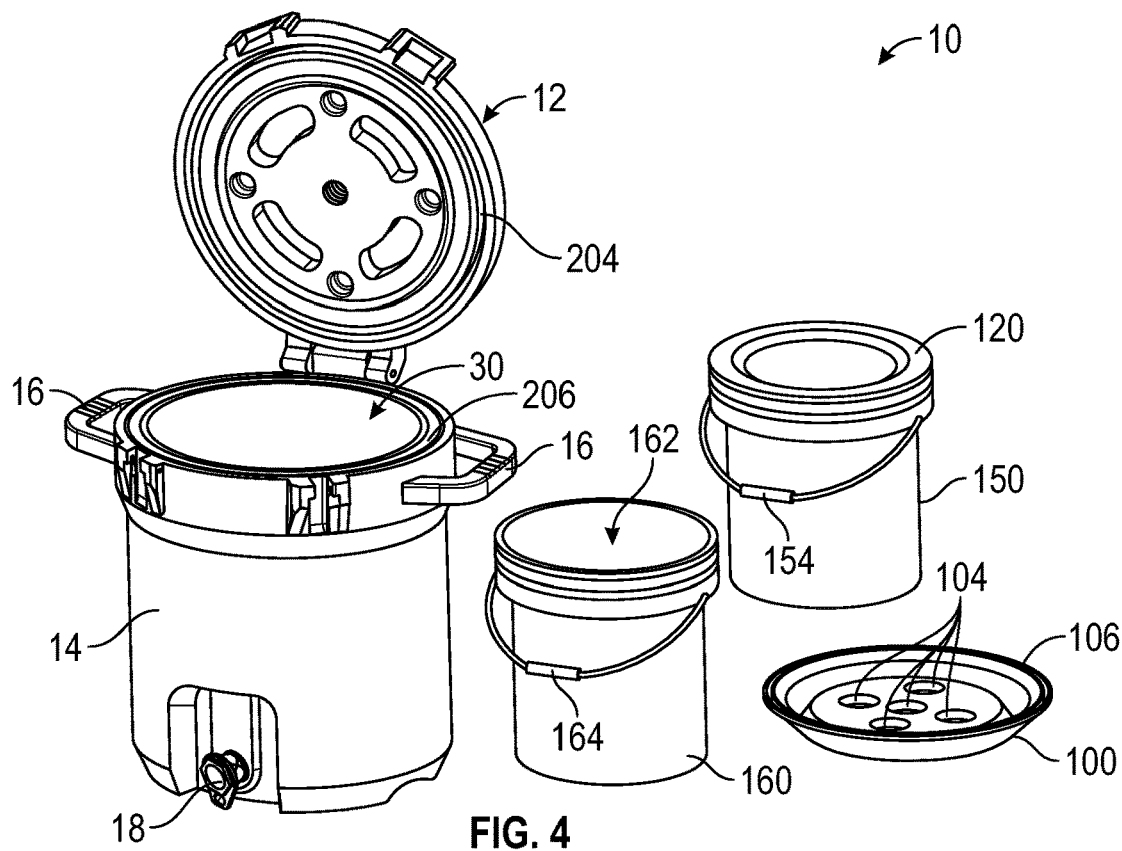
FIG. 4 illustrates the filtration cooler with the drip tray, the filter bucket, and the transfer bucket removed from the inside of the cooler reservoir.

Referring to FIGS. 1B, 2, and 4, the filtration cooler system 10 can include a plurality of components that are operable to be nested to fit within the reservoir receiving portion 30 of the cooler reservoir 14. Accordingly, the entirety of the filtration cooler system 10 can be easily packed within the cooler reservoir 14 with the lid 12 closed over the cooler reservoir 14 to conserve space and bulk, for example during travel or storage.

Figure 5:
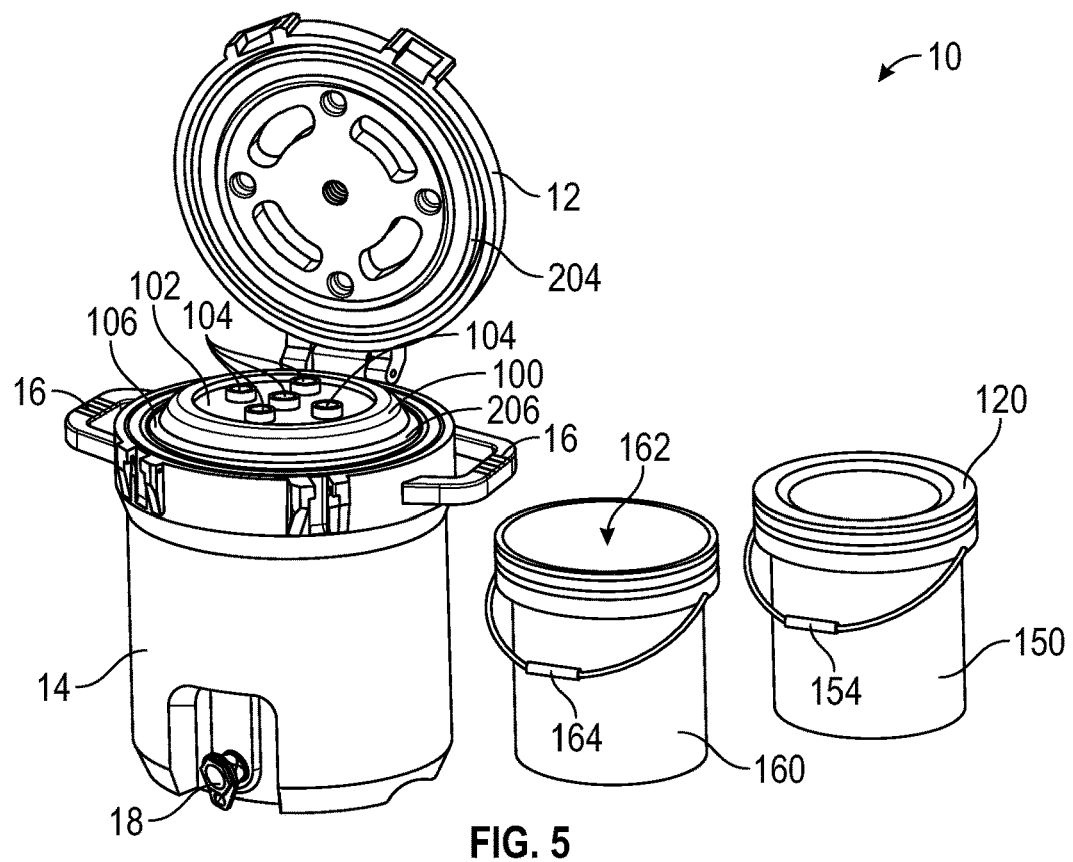
FIG. 5 illustrates the filtration cooler system with the drip tray disposed on the cooler reservoir.

Referring to FIGS. 1B, 4, and 5, the filtration cooler system 10 can include a drip tray 100 operable to be received by the cooler reservoir 14 such that the drip tray 100 is disposed over the reservoir receiving portion 30. The drip tray 100 includes a rim 106 which is operable to be received by the cooler reservoir 14 to maintain the position of the drip tray 100 over the reservoir receiving portion 30. In some examples, the rim 106 can be received by the gasket recess 206. The drip tray 100 includes a recess 102 operable to receive a filter bucket 150 on top of the drip tray 100. Accordingly, as shown in FIG. 7, when the drip tray 100 is disposed over the reservoir receiving portion 30, the filter bucket 150 can be placed on top of the drip tray 100 and secured in place as the filter bucket 150 is received in the recess 102.

Figure 6:
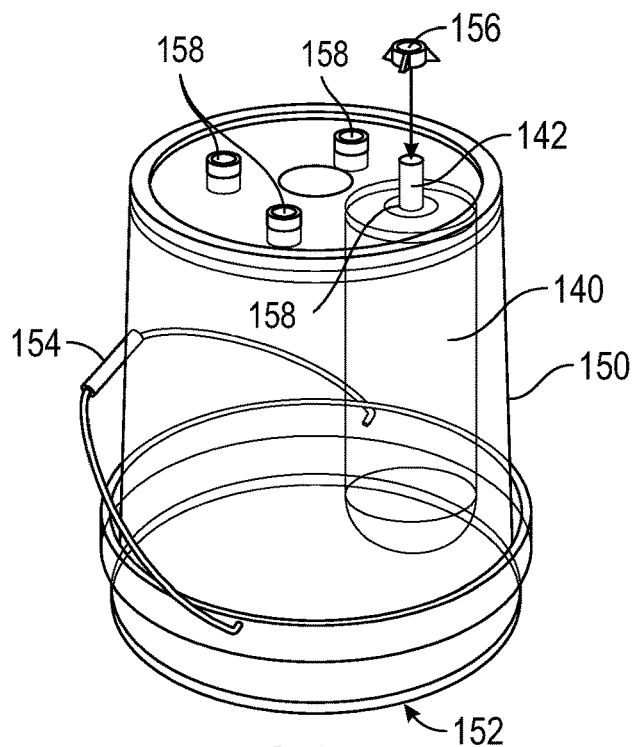
FIG. 6 illustrates the filter bucket with the filter installed therein.
Figure 7:
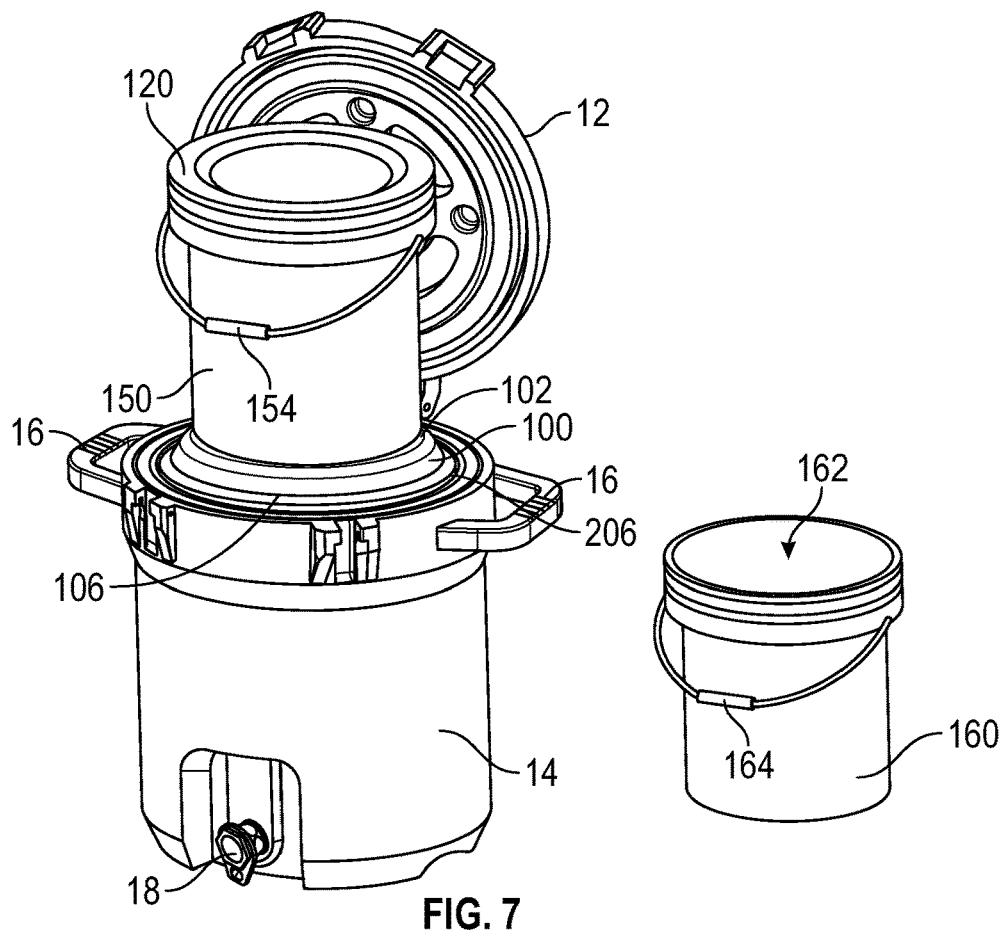
FIG. 7 illustrates the filter bucket received by the drip tray in a filtering configuration and positioned such that the transfer bucket can provide fluid to the filter bucket.

Referring to FIGS. 1B, 6, and 7, the filter bucket 150 has a filter receiving portion 152 operable to receive fluid such as water. A filter 140 is operable to be received in the filter bucket 150. As illustrated in FIG. 6, the filter bucket 150 can include one or more apertures 158 operable to receive an outlet 142 of the filter 140. In at least one example, a cap 156 can be provided to close the apertures 158 that are not utilized (e.g., do not have a filter 140 received therein). In at least one example, the drip tray 100 can also form one or more apertures 104 operable to receive the outlet 142 of the filter 140. The apertures 104 of the drip tray 100 can be operable to align with the apertures 158 of the filter bucket 150. Accordingly, when the filter bucket 150 is received in the recess 102 of the drip tray 100, the filter 140 is in fluid communication between the filter receiving portion 152 of the filter bucket 150 and the reservoir receiving portion 30 of the cooler reservoir 14. The water from the filter bucket 150 can then pass from the filter receiving portion 152 through the filter 140 and into the reservoir receiving portion 30.

The filter 140 is operable to filter the water in the filter bucket 150 such that the water passes from the filter bucket 150 into the reservoir receiving portion 30. The filter 140 can be operable to remove up to 99.99% of bacteria, viruses, chemicals, and/or heavy metals from the water as the water passes through the filter 140. In at least one example, the filter 140 can filter approximately 5000-6000 gallons of water before needing to be replaced. In some examples, the filter 140 can filter approximately 5700 gallons of water before needing to be replaced. In at least one example, the filter 140 can be a 3-layered filter. For example, the filter 140 can have a hybrid ceramic shell that filters larger-sized contaminants. The outer shell can be impregnated with pure silver to eliminate unhealthy bacterial growth. In the center of the filter 140 can be a carbon gravity block that filters out contaminants such as viruses.

A transfer bucket 160 is operable to receive water from a water source (e.g., stream, lake, faucet) and transfer the water to the filter bucket 150 to be filtered. The transfer bucket 160 can receive the water in the transfer receiving portion 162. The transfer bucket 160 provides convenience to the user, as the user can only transport the transfer bucket 160 back and forth from the water source. The transfer bucket 160 can also be used to prevent the filter bucket 150 and filter 140 from getting excessively dirty during retrieval of water, for example by scraping against mud. The transfer bucket 160 can include a handle 164 to allow for a user to easily lift and move the transfer bucket 160, for example with water inside.

With the filter bucket 150 received on the drip tray 100 which is disposed over the reservoir receiving portion 30, the transfer bucket 160 can transfer water from the water source into the filter bucket 150. The water from the filter bucket 150 can then pass from the filter receiving portion 152 through the filter 140 and into the reservoir receiving portion 30. The water inside the reservoir receiving portion 30 is then clean and safe to drink, even when the water source is not ideal, for example during camping or traveling. The recess 102 of the drip tray 100 and the rim 106 coupled with the cooler reservoir 14 also keeps any leaked water or unfiltered water from gaining access to the reservoir receiving portion 30.

The filter bucket 150 includes a removable lid 120 that can prevent access to the filter receiving portion 152. In at least one example, the removable lid 120 can be made of polypropylene. The removable lid 120 can be placed on the filter bucket 150 while water is being retrieved via the transfer bucket 160 to prevent debris from entering the filter receiving portion 152. Also, the removable lid 120 can be placed on the filter bucket 150 after water to be filtered has been deposited in the filter receiving portion 152 to prevent further debris from entering the filter receiving portion 152. This can help maintain a cleaner environment to extend the life of the filter 140. For example, when the filtration cooler system 10 is utilized during camping, the removable lid 120 can prevent leaves, bugs, dirt, etc. from entering the filter receiving portion 152. In at least one example, the filter bucket 150 includes a handle 154 to allow for a user to easily lift and move the filter bucket 150.

Figure 8:
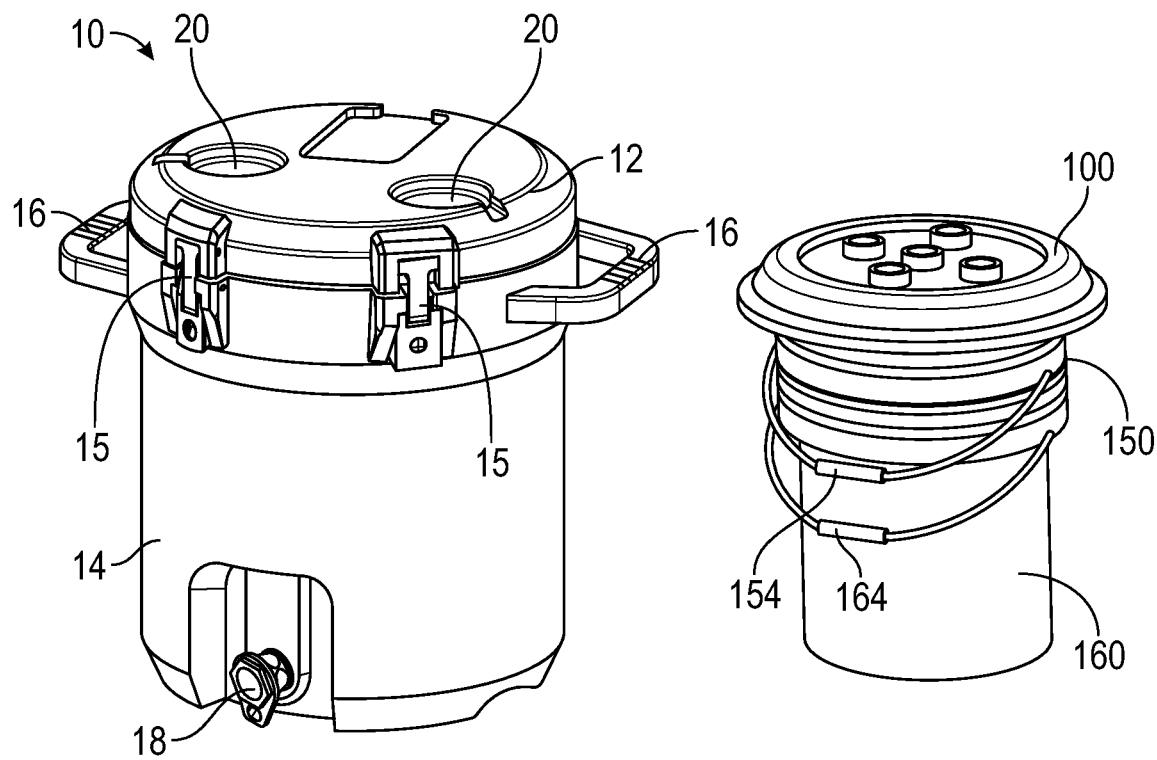
FIG. 8 illustrates the lid closed over the cooler reservoir to store the water in the cooler reservoir.

As illustrated in FIG. 8, after sufficient water is filtered and deposited in the reservoir receiving portion 30, the drip tray 100 and the filter bucket 150 can be removed from the cooler reservoir 14. The lid 12 can then be closed to cover the reservoir receiving portion 30 to maintain the temperature of the water (hotter or colder than the outside temperature) and maintain the cleanliness of the water. The water can then be accessed via the serving spout 18.

Figure 9:
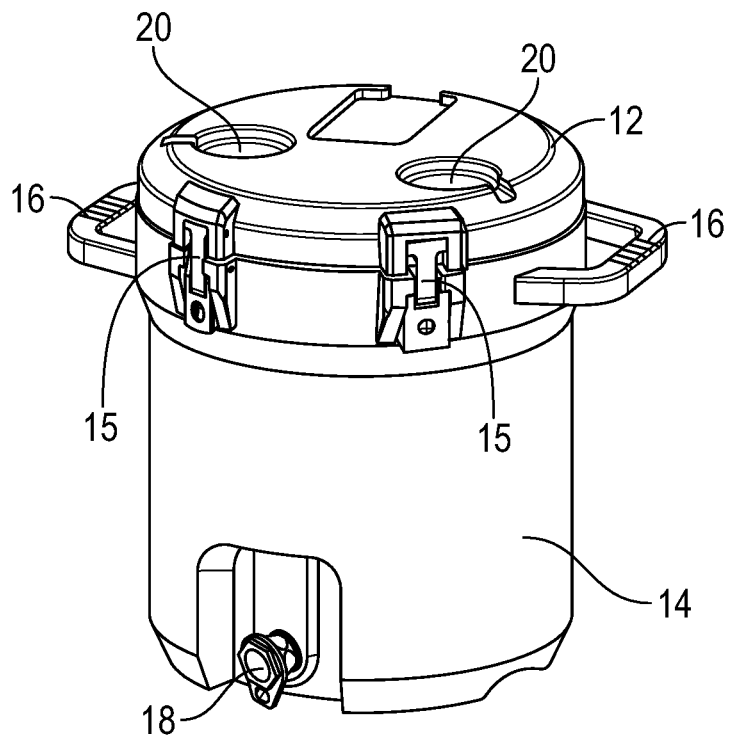
FIG. 9 illustrates the filtration cooler system in a nested configuration for storage.

As illustrated in FIG. 9, when the filtration cooler system 10 is not in use and ready for storage, the drip tray 100, filter bucket 150, and transfer bucket 160 are operable to be nested to fit within the reservoir receiving portion 30 when the lid 12 is closed over the cooler reservoir 14. The drip tray 100 is operable to be received in the filter receiving portion 152 of the filter bucket 150. The filter bucket 150 and drip tray 100 are then operable to be received in the transfer receiving portion 162 of the transfer bucket 160 without damaging the filter 140. With the drip tray 100, the filter bucket 150, and the transfer bucket 160 in the nested configuration and inserted into the reservoir receiving portion 30, the lid 12 can be closed to provide a convenient package for storage and/or travel.

The filtration cooler system 10 can be used anywhere on or off the grid. The filtration cooler system 10 can be stored and kept, for example, in an RV, boat, UTV, and/or at a vacation house/cabin. The filtration cooler system 10 is operable to provide a convenient and small-footprint storage configuration while being operable to transfer, filter, and store drinkable water.

Figure 10:
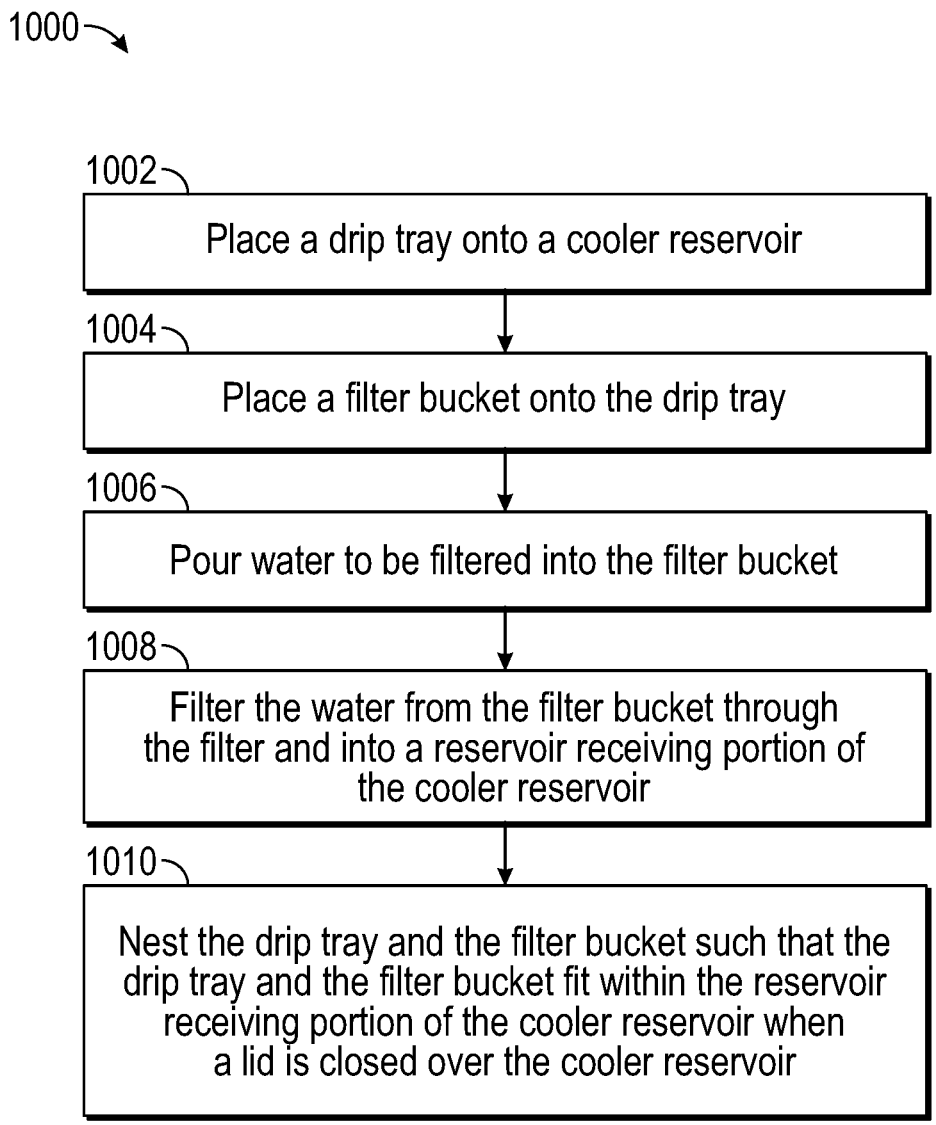
FIG. 10 is a flow chart of a method for utilizing the filtration cooler system according to the disclosure herein.

FIG. 10 is an example method 1000 for tracking and/or tracing devices, in accordance with various aspects of the subject technology. The method 1000 is provided by way of example, as there are a variety of ways to carry out the method. The method 1000 described below can be carried out using the configurations illustrated in FIGS. 1A-9, for example, and various elements of these figures are referenced in explaining example method 1000. Each block shown in FIG. 10 represents one or more processes, methods or subroutines, carried out in the example method 1000. Furthermore, the illustrated order of blocks is illustrative only and the order of the blocks can change according to the present disclosure. Additional blocks may be added or fewer blocks may be utilized, without departing from this disclosure. The method 1000 can begin at block 1002.

At block 1002, a drip tray is placed onto a cooler reservoir.

At block 1004, a filter bucket is placed onto the drip tray. The filter bucket can include a filter installed therein. In at least one example, the filter can be installed into the filter bucket by receiving an outlet of the filter in an aperture formed in the filter bucket. In some examples, the drip tray can form one or more apertures operable to receive the outlet of the filter. The apertures of the drip tray can be operable to align with the apertures of the filter bucket.

At block 1006, water to be filtered is poured into the filter bucket. The water can be poured into the filter bucket from a transfer bucket.

At block 1008, the water from the filter bucket is filtered through the filter and into a reservoir receiving portion of the cooler reservoir.

At block 1010, to store the filtration cooler system, the drip tray and the filter bucket can be nested such that the drip tray and the filter bucket fit within the reservoir receiving portion of the cooler reservoir when a lid is closed over the cooler reservoir. In at least one example, the drip tray and the filter bucket are operable to be nested within the transfer bucket such that the drip tray, filter bucket, and transfer bucket fit within the reservoir receiving portion of the cooler reservoir when the lid is closed over the cooler reservoir.

In at least one example, the lid is operable to receive an ice pack. The ice pack can be coupled to the underside of the lid such that, when the lid is closed, the ice pack is in communication with the reservoir receiving portion. Accordingly, when water is stored in the reservoir receiving portion, the ice pack can assist in maintaining a cooler temperature of the water inside the reservoir receiving portion.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A filtration cooler system comprising:
a cooler reservoir having a reservoir receiving portion;
a lid coupled with the cooler reservoir to form a seal with the cooler reservoir when the lid is closed to completely cover the reservoir receiving portion;
a drip tray operable in a filtering configuration to be received by the cooler reservoir such that the drip tray is disposed over the reservoir receiving portion, wherein the drip tray includes a rim which is operable to be received by the cooler reservoir to maintain the position of the drip tray over the reservoir receiving portion;
a transfer bucket operable to receive water from a water source;
a filter bucket having a filter receiving portion operable to receive the water from the transfer bucket, the filter bucket operable to be received by the drip tray when the drip tray is disposed over the reservoir receiving portion of the cooler reservoir;
a filter operable to be received in the filter bucket, the filter operable to filter the water in the filter bucket such that the water passes from the filter bucket into the reservoir receiving portion,
wherein in the filtering configuration, the drip tray includes a recess operable to receive the filter bucket on top of the drip tray, wherein the recess of the drip tray and the rim coupled with the cooler reservoir prevent leaked water or unfiltered water from gaining access to the reservoir receiving portion,
wherein the drip tray and the filter bucket are operable to be nested, in a storage configuration, within the transfer bucket such that the drip tray, filter bucket, and transfer bucket fit within the reservoir receiving portion of the cooler reservoir when the lid is closed over the cooler reservoir,
wherein in the storage configuration, the drip tray is configured to be inverted from its position in the filtering configuration to be nested in the filter bucket.

2. The filtration cooler system of claim 1, wherein the cooler reservoir includes insulation to reduce heat flow across the cooler reservoir.

3. The filtration cooler system of claim 2, further comprising an ice pack, wherein the lid includes one or more ice fasteners operable to removably couple the ice pack to an underside of the lid, wherein the ice pack is coupled to the underside of the lid so that the ice pack is in communication with the reservoir receiving portion when the lid is closed over the reservoir receiving portion, wherein the ice pack and the insulation maintain a cooler temperature for the water within the reservoir receiving portion when the lid is closed.

4. The filtration cooler system of claim 1, wherein the filter bucket forms one or more apertures operable to receive an outlet of the filter.

5. The filtration cooler system of claim 4, wherein the drip tray forms one or more apertures operable to receive an outlet of the filter, wherein the one or more apertures of the drip tray are operable to align with the one or more apertures of the filter bucket.

6. The filtration cooler system of claim 1, wherein the lid includes a gasket operable to be received in a recess in the cooler reservoir.

7. The filtration cooler system of claim 1, further comprising a serving spout in fluid communication with the reservoir receiving portion.

8. The filtration cooler system of claim 1, further comprising a filter bucket lid operable to cover the filter receiving portion of the filter bucket.

9. The filtration cooler system of claim 1, wherein the cooler reservoir includes a vent port proximate to the lid.

10. The filtration cooler system of claim 9, further comprising a vent plug operable to be inserted into the vent port.

11. The filtration cooler system of claim 1, wherein the cooler reservoir includes two handles.

12. A method comprising:
placing a drip tray onto a cooler reservoir, wherein the drip tray includes a rim which is operable to be received by the cooler reservoir to maintain the position of the drip tray over a reservoir receiving portion, wherein the drip tray includes a recess operable in a filtering configuration to receive a filter bucket on top of the drip tray;

placing the filter bucket onto the drip tray, wherein the filter bucket includes a filter installed therein;

pouring water to be filtered into the filter bucket from a transfer bucket;

filtering the water from the filter bucket through the filter, and into the reservoir receiving portion of the cooler reservoir, wherein the recess of the drip tray and the rim coupled with the cooler reservoir prevent leaked water or unfiltered water from gaining access to the reservoir receiving portion; and nesting, in a storage configuration, the drip tray and the filter bucket such that the drip tray and the filter bucket fit within the reservoir receiving portion of the cooler reservoir when a lid is closed over the cooler reservoir, wherein in the storage configuration, the drip tray is configured to be inverted from its position in the filtering configuration to be nested in the filter bucket, wherein the drip tray and the filter bucket are operable to be nested, in the storage configuration, within the transfer bucket such that the drip tray, filter bucket, and transfer bucket fit within the reservoir receiving portion of the cooler reservoir when the lid is closed over the cooler reservoir, wherein the lid is operable to form a seal with the cooler reservoir when the lid is closed to completely cover the reservoir receiving portion.

13. The method of claim 12, further comprising:
installing the filter into the filter bucket by receiving an outlet of the filter in an aperture of one or more apertures formed in the filter bucket.

14. The method of claim 13, wherein the drip tray forms one or more apertures operable to receive the outlet of the filter, wherein the one or more apertures of the drip tray are operable to align with the one or more apertures of the filter bucket.

15. The method of claim 12, wherein the cooler reservoir includes insulation to reduce heat flow across the cooler reservoir, wherein an ice pack is operable to removably couple to an underside of the lid via one or more ice fasteners, wherein the ice pack is coupled to the underside of the lid so that the ice pack is in communication with the reservoir receiving portion when the lid is closed over the reservoir receiving portion, wherein the ice pack and the insulation maintain a cooler temperature for the water within the reservoir receiving portion when the lid is closed.

* * * * *